US006336263B1

(12) United States Patent
Weiss et al.

(10) Patent No.: US 6,336,263 B1
(45) Date of Patent: Jan. 8, 2002

(54) CLUB AND SHAFT SEPARATING DEVICE

(76) Inventors: Richard M. Weiss, 9050 SW. Ct., Miami, FL (US) 33156; Lew Gibson, 1310 Waterwood Dr., Arlington, TX (US) 76012

( * ) Notice: Subject to any disclaimer, the term of this patent is extended or adjusted under 35 U.S.C. 154(b) by 0 days.

(21) Appl. No.: 09/499,367

(22) Filed: Feb. 7, 2000

(51) Int. Cl.[7] .................................................. B23P 19/04
(52) U.S. Cl. ............................................ 29/252; 29/239
(58) Field of Search .......................... 29/252, 239, 256, 29/237; 254/106, 30, 29 R; 269/43

(56) References Cited

U.S. PATENT DOCUMENTS 2,680,287 A * 6/1954 Wilson ........................ 29/239
2,952,131 A * 9/1960 Lyroudias .................... 254/30
3,317,185 A * 5/1967 Burk ........................... 254/30
3,711,920 A * 1/1973 Simmons ...................... 269/43
3,858,846 A * 1/1975 Schmid ....................... 254/100
3,973,315 A * 8/1976 Thanghe ....................... 29/239
4,657,225 A * 4/1987 Hoehn ........................ 254/100
5,590,452 A * 1/1997 Mead .......................... 29/239

* cited by examiner

*Primary Examiner*—Joseph J. Hail, III
*Assistant Examiner*—Daniel Shanley
(74) *Attorney, Agent, or Firm*—W. Warren Taltavull

(57) ABSTRACT

A shaft and club head separation device for a golf club includes a base having padded shaft gripping members and a separation disk having at least two peripheral recesses into which the end of shaft is inserted; the gripping members are arranged to maintain the club shaft parallel to the axis of the separation disk; a plunger in slidably disposed in a bore in the base and an actuation device is provided to engage the plunger and move the plunger and disk away from the base so that, with the hosel of a club engaging a face of the disk, separation of the shaft and club head will occur.

23 Claims, 3 Drawing Sheets

CLUB AND SHAFT SEPARATING DEVICE

FIELD OF THE INVENTION

The present invention relates to a device for separating a golf club head from its associated shaft to permit repair, adjustment or replacement of the shaft or the head as may be required. More specifically, the apparatus of the present invention will enable more accurate and rapid separation of a club head from its shaft while minimizing or eliminating any damage to the shaft or head itself.

BACKGROUND OF THE INVENTION

In the field of the golf club design, the practice of aligning the detected spine of a shaft relative to the face of a club is becoming more widespread. To effect such alignment, it is necessary to first remove the club head from its associated shaft to allow the technician to test the shaft and to carry out the realignment relative to the club face in order to improve the club performance or to remove anomalies in the use of the club. In removing a club head, it is important and necessary to avoid any damage to the shaft. This has in the past required a great deal of time on the part of the technician.

Several separation devices have been developed and these generally include a gripping device which operates adjacent to the hosel of the club. Such devices have been time consuming to operate and often resulted in scratching of the customer's shaft. In addition, the prior art devices have not lent themselves to installation in a production facility so as to allow the devices to be used in a high production line. In some cases, the prior art devices have effected the separation in a manner to render the shaft useless for future use thereby requiring replacement. In still other arrangements, the prior art relied upon the manual strength of the technician to effect the separation and this also has led to damage to the club head and/or the shaft.

SUMMARY OF THE INVENTION

The separation device of the present invention avoids the foregoing difficulties by providing a device that will accommodate a variety of different shaft diameters in an accurate manner and which will apply a uniform separation force in a uniform direction substantially parallel to the longitudinal axis of the shaft thereby avoiding a primary source of the damage to the shaft and club head encountered with prior devices. In one embodiment, the present invention provides a base that defines an extended and padded gripping portion for the shaft at a location on the shaft that is spaced from the club head. A separation member is provided in the form of a disk that is rotatably mounted on the base by means of a shaft which is engaged by a pusher member or plunger through a resilient connection. The pusher member may be connected to a hydraulic or pneumatic actuator cylinder to provide the force necessary to effect translation of the shaft and the disk away from the base member to effect separation. The periphery of the disk is slotted with the slots being of different sizes to allow the disk to engage a range of different diameter shafts.

With the arrangement of the present invention, much more rapid and safer extraction of the shaft from a club head can be effected than was previously possible. The foregoing and other advantages will become apparent as consideration is given to the following description and drawings, in which:

BRIEF DESCRIPTION OF THE DRAWINGS

FIG. 3A is a sectional view of the lower gripping element while

DETAILED DESCRIPTION OF THE INVENTION

Figure 1:
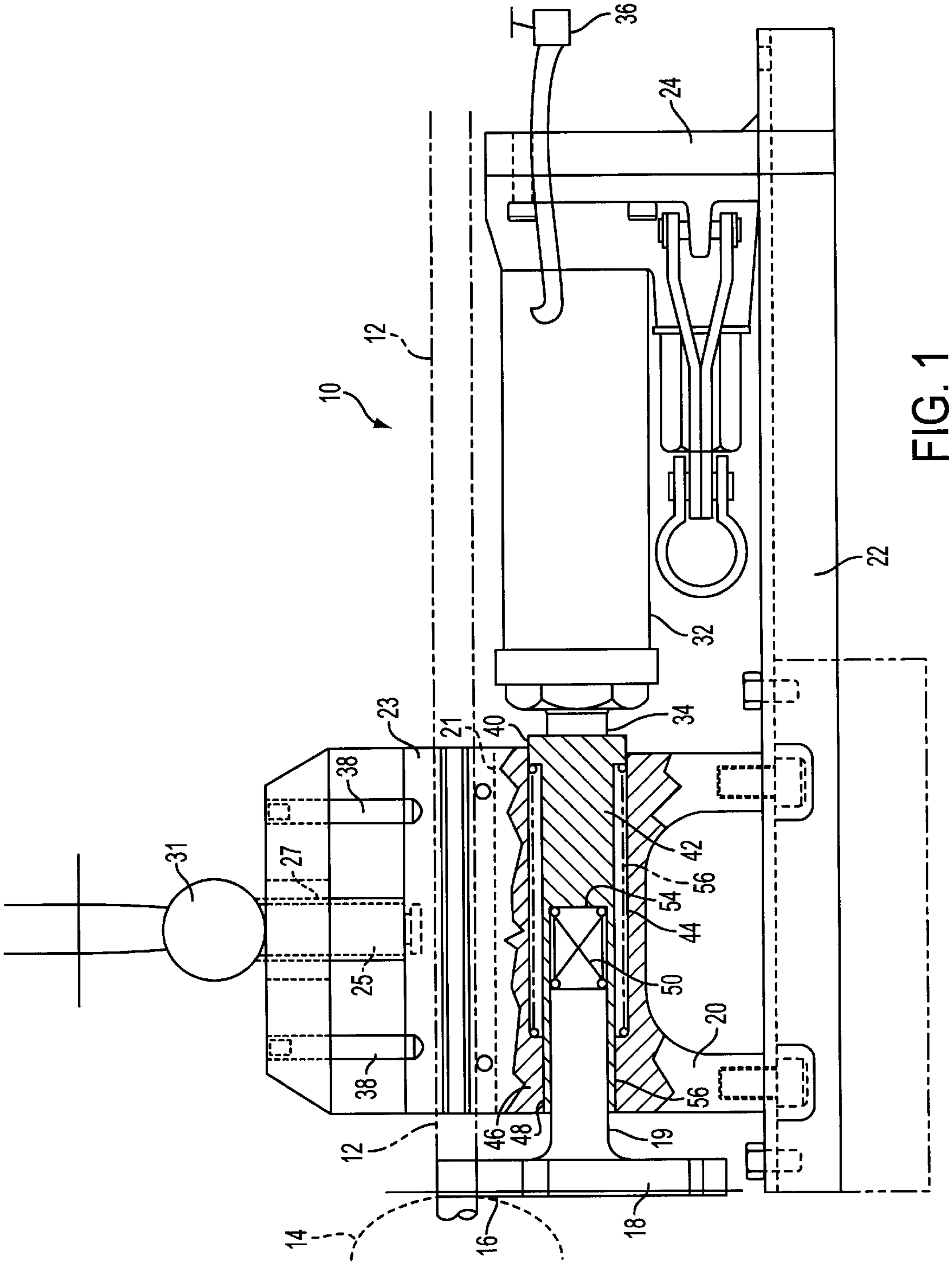
FIG. 1 and is a side view in elevation of the apparatus of the present invention.

Referring to the drawings, where like numerals designate corresponding parts throughout the several views, there is shown in FIG. 1 the apparatus 10 of the present invention which includes a platform 22 on which a support block 20 is rigidly mounted. The block 20 rotatably supports a disk 18 on a shaft 19 which is inserted into a bore in block 20. As described in more detail below, the periphery of the disk 18 is formed with a plurality of slots 26 having differing dimensions to allow the disk to accommodate different diameter shafts 12 of a golf club 14.

As shown in FIG. 1, prior to extraction, the golf club 14 will be disposed to extend generally parallel to the platform 22 with the hosel 16 engaging the outer face of the disk 18.

Figure 3A:
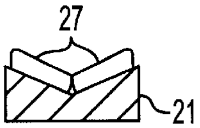
Figure 3B:
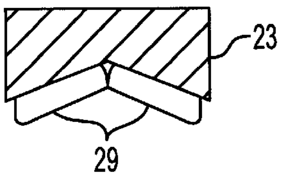
FIG. 3B is a sectional view of the upper, movable gripping element.
Figure 3C:
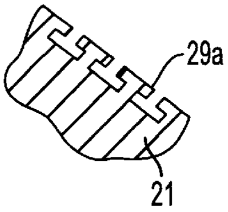
FIG. 3C is sectional view showing a manner of securing a pad to its insert member.

Referring to the drawings, the upper surface of the block 20 is provided with a groove in which is placed an elongated insert 21, the upper face of which is V shaped as seen more clearly in FIG. 3A. Protective pads 27, preferably of vulcanized rubber or Neoprene, are secured as by an adhesive to the two sides of the upper face of the insert 21 to provide a padded layer against which a portion of the golf shaft will lie when disposed in the device 10. The upper face 21 of the insert may alternatively be formed with a grid pattern with an undercutting 29*a* as shown in FIG. 3C, so that, when the rubber, in a softened condition, is poured onto the upper face of the insert 21, a secure attachment will be effected when the rubber cools and stiffens. The movable plate 23 has an opposing face similarly shaped as shown in FIG. 3B. The face of the plate 23 is provided with a padded layer 29 so as to eliminate or minimize any slippage of the shaft or damage to the surface of the golf shaft 12. For golf club shafts which are almost all smooth surfaced, the length of the plates 21 and 23 and their respective pads 27 and 29 should be approximately 4 inches. The plate 23 is moved by a threaded rod 25 which extends through a threaded bore 27 in upstanding arm 39 and terminates with a handle 31. One or more guide pins 38 are mounted in the upstanding arm 39 to extend parallel to the bore 27. The plate 23 will be formed with a corresponding set of bores to receive the guide pins 38 to assure accurate alignment during movement.

Also mounted on platform 22 is a plate 24 to which is attached a jack 30 which may be of the pneumatic or hydraulic type. The jack 30 will include a piston and piston rod 34 as shown in FIG. 3. The jack 30 may be connected to a source of fluid under pressure and its operation controlled by a manual valve 36 or the jack 30 may be of the type that is manually pumped by a user.

Referring to FIG. 1, the rod 34 of the jack 30 is directly connected to one end of a plunger 40 which is slidably mounted in a bore 44 formed in block 20. The body 42 of the plunger 40 extends through the bore 44 and through opening 46 toward the disk 18. The opposite end of the plunger 40 that extends through the opening 46 is provided with a bore 48 into which shaft 19 of disk 18 extends an amount to provide a stable positioning of the disk 18 relative to the block 20.

With the foregoing arrangement, in operation, a user will place a shaft 12 as shown in FIG. 1 with the lower end adjacent the head 14 disposed in the appropriate slot of the disk 18 and with the hosel 16 of the club 14 engaged against the face of the disk 18 opposite the block 20. The plate 23 will be lowered by rotating the handle until the shaft 12 is securely engaged. The longitudinal axis of the shaft 12 will extend substantially parallel to the longitudinal axis of the plunger 40 and the shaft 19 both of which by virtue of their interengagement will be constrained to move parallel and coaxially. The user may then heat the end of the shaft that is inserted into the hosel 16 to soften the adhesive, usually an epoxy, that holds the shaft and club together. The jack is then operated to extend the piston rod 34 to the left as viewed in FIGS. 1. This will first result in compression of the spring 50 disposed between the end 52 of shaft 19 and the base 54 of recess 48 which, at the same time, will exert a force on the club head 14 of gradually increasing magnitude as the plunger 40 advances to the left. Often, separation of the club head 14 will be effected before the spring 50 is fully compressed. However, if separation does not occur upon fully compressing the spring 50, the end of shaft 19 will contact the base 54 of recess 48 and the amount of force imparted to the club head 14 by the face of disk 18 will increase to assure separation as the plunger 40 and shaft 19 and disk 18 advance together leftwardly while the shaft 12 is held between the plates 21 and 23. Continued heating with an external source of heat may also be employed to assist in separating the club head 14 from the shaft 12.

Once separation has taken place, the handle 31 is rotated to retract the plate 23 to free the shaft 12. The jack 42 is vented to allow the spring 56 to move the plunger 40 to the right as viewed in FIG. 1.

Figure 2:
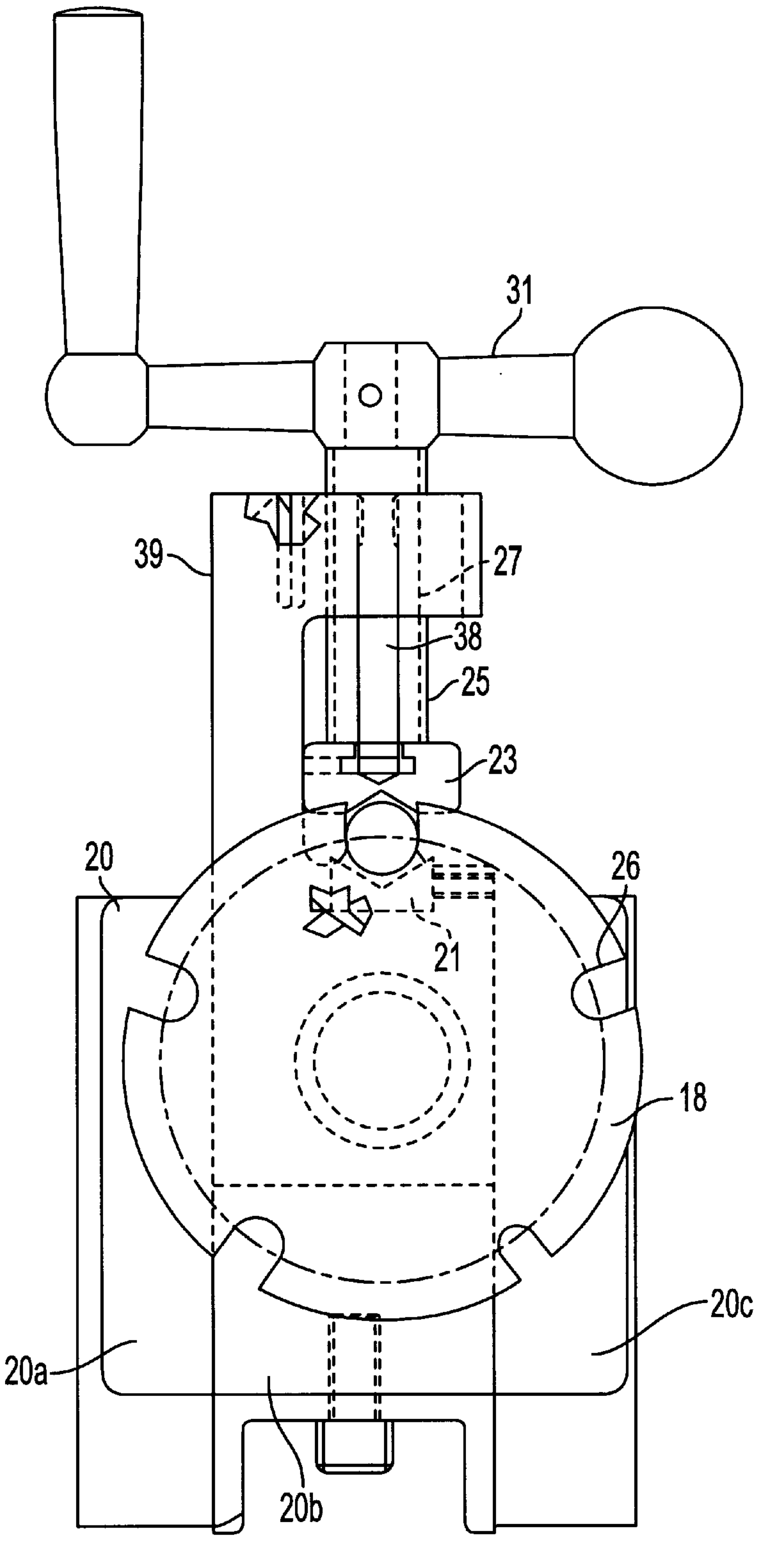
FIG. 2 is an end view looking to the left of FIG. 1 with the golf club head removed.

To facilitate servicing of the apparatus 10, the block 20, as shown in FIG. 2, is formed from three component blocks, 20*a*, 20*b* and 20*c* which may be held together by bolts, not shown. With this arrangement, access to the plunger chamber 44 will be facilitated for servicing such as lubrication and cleaning.

Figure 4:
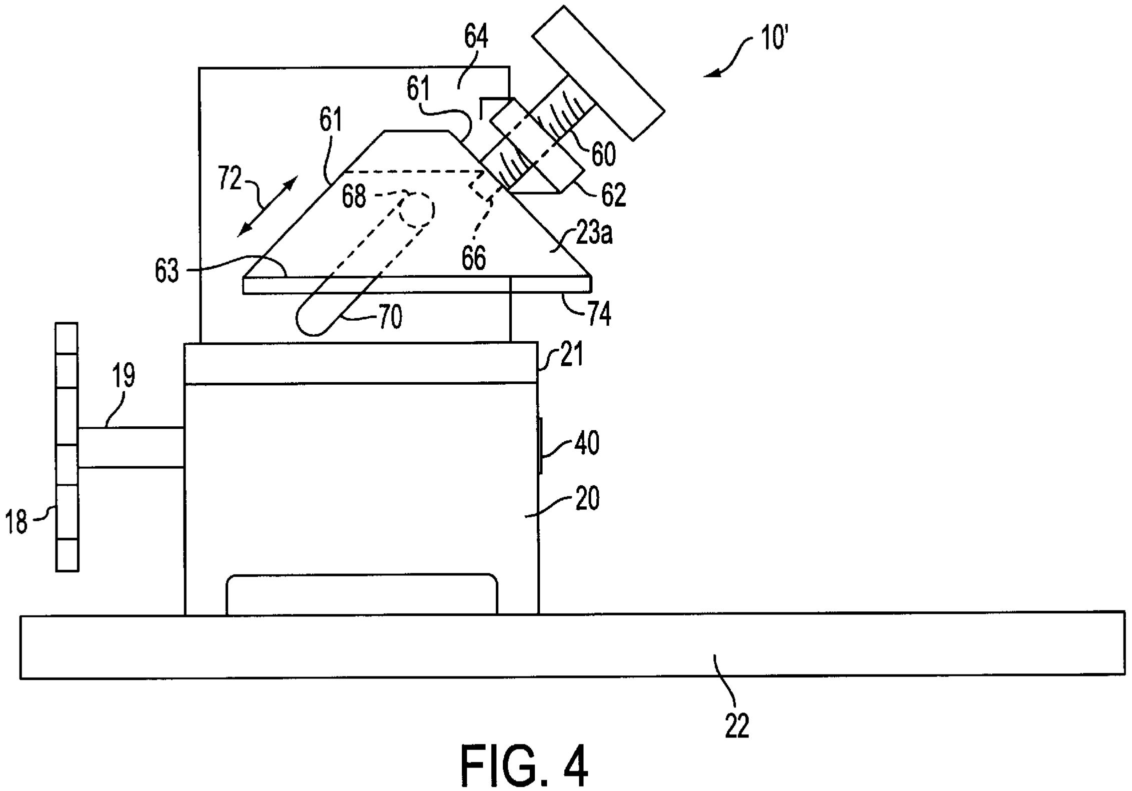
FIG. 4 is a side view in elevation of an alternate form of the invention.
Figure 5:
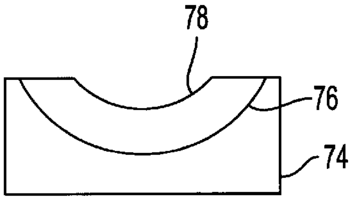
FIG. 5 is a section view of an alternate gripping element.

With reference to FIG. 4, there is shown an alternate form of the invention with corresponding parts bearing the same numerals as the previous embodiment. In FIG. 4, the operation of the gripping member 23*a* differs from that of member 23 in the previous embodiment in that the travel between the retracted position (as shown in FIG. 4) and the gripping position is at an angle to the upper face 21 of the base 20. Specifically, the plate 23*a* is provided with sides 61 which extend at an acute angle with respect to the bottom face 63 of the plate 23*a* . The side 61 that is remote from the disk 18 is connected to one end of threaded rod 60 which is mounted in a plate 62 carried by the rear wall 64 of the device 10'. The rear wall 64 may be secured to the platform 22 as by bolting (not shown). The rear wall is provided with a recess or slot 70 in its face for receiving a pin 68 carried by the side face of the plate 23*a* . Other guiding devices such as a track, rails or the like may be employed. The pin 68 and slot 70 cooperate to allow movement of the plate 23*a* in the direction of arrows 72 when the rod is rotated by its handle. The lower face of the plate 23*a* is provided with a plate 74 while the upper face of the base 20 is provided with a similarly shaped plate 21 as in the previous embodiment. However, as shown in the section view of FIG. 5, the plate 74 and, if desired, the plate 21 are formed with an arcuate face 76 along their respective lengths and support an arcuate pad 78 preferably of the same length as the respective plates.

With this arrangement, with a golf club shaft disposed on the pad of plate 21, a user will move the plate 23*a* toward the plate 21 along the path of the slot 70 to engage the upper portion of the club shaft and grip the club shaft with the pad of the plate 74 and the pad of plate 21. Some play in the gripping action can be achieved by reducing the diameter of pin 68 and by allowing a degree of rotation in plate 62. This will assure a close fit with the surface of the club shaft and compensate for the taper common in golf club shafts.

Having described the invention, it will be apparent to those skilled in the art that various modifications may be made thereto without departing from the scope of this invention as defined in the appended claims.

What is claimed is:

1. A separation apparatus for separating a club head from a club shaft to which the club head is attached comprising:

a) a movable gripping member for engaging and holding the club shaft at a first position spaced from the club head, said gripping member being mounted on a base and cooperating with a portion of said base to define a gripping area for the club shaft, b) a separation member mounted on said base for translation toward and away from said base in a direction substantially parallel to the longitudinal axis of a club shaft gripped by said gripping member and said portion of said base, said separation member including a club shaft engaging portion for engaging the club shaft in a closely interfitting manner at a second position spaced from said first position and during said translation for engaging the club head, c) an actuation device for effecting said translation of said separation member away from said base to effect separation of the club head from the club shaft.

2. The invention as claimed in claim 1 wherein said movable gripping member includes a plate having a face, a resilient pad attached to said face.

3. The invention as claimed in claim 2 wherein said face of said plate is V shaped in section with said plate having two faces defining said V shape and a resilient pad being attached to each of said two faces.

4. The invention as claimed in claim 2 wherein said face is semi circular in section and is covered with a complementarily shaped resilient pad.

5. The invention as claimed in claim 2 wherein said pad is neoprene.

6. The invention as claimed in claim 2 wherein said pad is rubber.

7. The invention as claimed in claim 4 wherein said pad is neoprene.

8. The invention as claimed in claim 4 wherein said pad is rubber.

9. The invention as claimed in claim 1 wherein said base has an upper surface and opposite sides extending from said upper surface and is provided with a bore extending through said base from one said side to the opposite side, said bore being spaced from said upper surface, said portion of said base including a plate member attached to said portion of said base, said plate member extending substantially parallel to said bore and including a resilient pad.

10. The invention as claimed in claim 9 wherein said bore includes a plunger movably disposed in said bore and having opposite ends, one of said ends being connected to said actuation device, the opposite of said ends having a recess receiving a portion of said separation member.

11. The invention as claimed in claim 10 wherein said recess of said opposite of said ends is cylindrical, said separation member comprising a disk having a center and opposite faces, one face including a shaft extending from said center into said recess to allow said disk to be rotated about said center.

12. The invention as claimed in claim 11 wherein said recess in said plunger has a selected length and a bottom and said shaft of said disk extends a portion of said length and terminates a distance from said bottom of said recess.

13. The invention as claimed in claim 12 wherein a resilient member is disposed in said recess between said bottom of said recess and said shaft of said disk.

14. The invention as claimed in claim 10 wherein said separation member includes a disk having a periphery, said periphery including at least two recesses of different dimensions for receiving different sized shaft portions.

15. The invention as claimed in claim 14 wherein said bore includes a return spring surrounding said plunger and engaging one end of said bore and a portion of said plunger.

16. The invention as claimed in claim 1 wherein said actuation device is a pneumatic cylinder and piston.

17. The invention as claimed in claim 16 wherein said cylinder is connected to a manually operated jack.

18. The invention as claimed in claim 16 wherein said cylinder is connected through a valve to a source of fluid under pressure.

19. The invention as claimed in claim 15 wherein said actuation device is a fluid actuated member including a piston, said piston being coupled to one end of said plunger.

20. The invention as claimed in claim 1 wherein said movable gripping member includes a plate connected to a moving member to move said plate toward and away from said portion of said base.

21. The invention as claimed in claim 20 wherein said base includes at least one guide pin cooperating with a bore formed in said plate to guide the movement of said plate toward and away from said portion of said base.

22. The invention as claimed in claim 20, wherein said moving member is a threaded rod coupled to said plate, said rod engaging a threaded bore provided on a portion of said base.

23. The invention as claimed in claim 20 wherein said base includes a slot extending at an angle to said base and said plate includes a pin engaged in said slot, said moving member includes a threaded rod extending parallel to said slot and engaging a threaded bore in said base.

* * * * *